J. D. GOSS.
SAW HANDLE.
APPLICATION FILED APR. 3, 1919.
1,316,479. Patented Sept. 16, 1919.
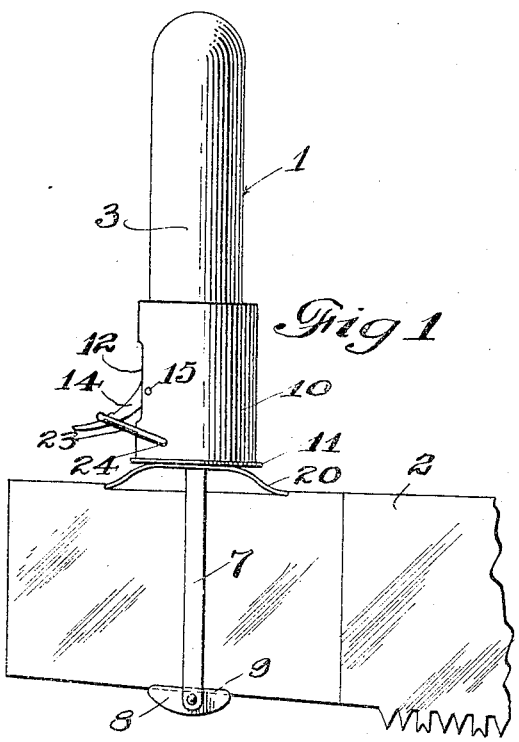
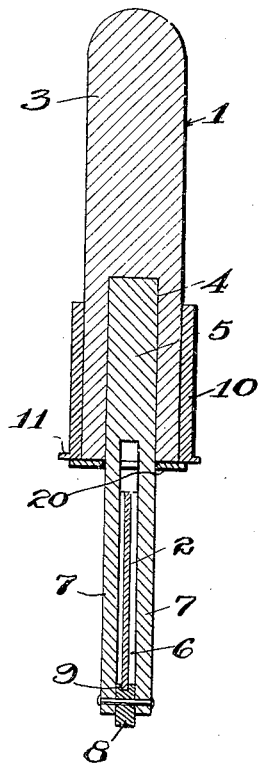
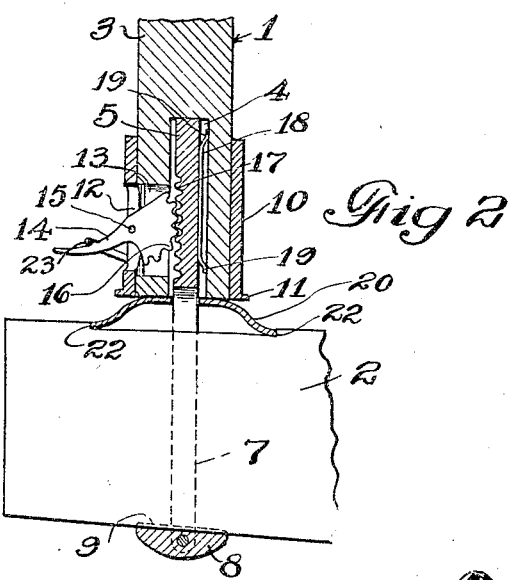
Inventor
J. D. Goss
By Randolph Jr., Attorney

UNITED STATES PATENT OFFICE.

JEFF D. GOSS, OF LAKE CITY, FLORIDA.

SAW-HANDLE.

1,316,479.  Specification of Letters Patent.  Patented Sept. 16, 1919.

Application filed April 3, 1919. Serial No. 287,215.

*To all whom it may concern:*

Be it known that I, JEFF D. GOSS, a citizen of the United States, residing at Lake City, in the county of Columbia and State of Florida, have invented certain new and useful Improvements in Saw-Handles; and I do hereby declare the following to be a full, clear, and exact description of the invention, such as will enable others skilled in the art to which it appertains to make and use the same.

This invention relates to saw handles and the primary object of the invention is to provide an improved saw handle which can be readily attached or detached from the saw in a convenient and expedient manner.

Another object of the invention is to provide an improved detachable handle for crosscut saws, which can be applied to or taken off of the saw in a very short space of time without injury to the saw.

A further object of the invention is to provide a handle for crosscut saws, which can be readily applied thereto, and having means for locking the handle in place against accidental removal.

A still further object of the invention is to provide an improved handle for crosscut saws of the above character, which is durable and efficient in use, one that is simple and easy to manufacture, and one that can be placed upon the market at a reasonable cost.

With these and other objects in view the invention consists in the novel construction, arrangement and formation of parts, as will be hereinafter more specifically described, claimed and illustrated in the accompanying drawings, forming a part thereof in which;

Figure 1 is a side elevation of the improved handle attached to a saw,

Fig. 2 is a vertical longitudinal section through the saw handle, showing the same in position on the saw ready for removal, and Fig. 3 is a vertical section through the saw handle taken at right angles to Fig. 2.

Referring to the drawings in detail, wherein similar reference characters designate corresponding parts throughout the several views, the numeral 1 generally indicates the improved saw handle, which is adapted to be used in connection with the ordinary or any preferred type of crosscut saw 2.

The saw handle 1 includes a cylindrical solid grip 3, preferably formed of wood or the like having an inwardly extending bore 4, which slidably receives the loop 5, which has the lower end thereof slotted as at 6 for receiving the saw blade 2. The slot 6 defines a pair of arms 7 which are adapted to embrace the sides of the saw blade 2, and the arms have their lower ends riveted or otherwise secured to a substantially semi-elliptical block 8, having a groove 9 formed in the upper edge thereof for slidably receiving the lower edge of the saw blade 2.

A ferrule 10 is fitted around the lower end of the hand grip 3 and protects the same from splitting and the same is provided with an outstanding annular flange 11 formed on the lower edge thereof. The ferrule 10 is provided with a slot 12, which registers with a slot 13 formed in the hand grip 3, which communicates with the bore 4 thereof. An arc carrying lever 14 is pivoted as at 15 to the walls of the slot 13 in the hand grip and has the inner edge thereof provided with teeth 16 which are arranged substantially along an arcuate line and adapted to mesh with the rack teeth 17, formed on one edge of the loop 7.

A leaf spring 18 is fitted in the bore 4 of the hand grip and has the ends 19 thereof bent outwardly and secured in the hand grip, and this spring is adapted to bear against the upper end of the loop, diametrically opposite to the cam lever 14, so as to hold the loop into engagement with the same.

An arcuate leaf spring is positioned between the legs and bears against the lower edge of the hand grip 3 and the ferrule 10. The upper edge of the saw blade 2 is cut away on each side of the loop 7 and provides shoulders 22 which are adapted to be engaged by the terminals of the leaf spring 20.

When it is desired to clamp the handle upon the saw blade 2, the same is moved to the desired position and the arc carrying lever 14 is thrown downwardly which, through the medium of the gear teeth 16 and rack bar 17, moves the loop 7 upwardly and the hand grip downwardly, which compresses the leaf spring 20 and forces the terminals thereof into engagement with the shoulders 22 and thus prevents movement of the saw handle on the sawblade 2. When it is desired to remove the handle from the blade, the gear arc carrying lever is merely swung upwardly, which forces the loop 7 and handle in opposite directions and allows the leaf spring to resume its normal position, and thus permits the ready displacement of the handle. A bail 23 is pivoted as at 24 to the ferrule 10 and is arranged to swing over the gear arc carrying lever 14 when the same is in its lowered position, so as to hold the same against movement and thereby hold the handle in locked position on the saw blade 2 against accidental displacement.

In practice, I have found that the form of my invention illustrated in the accompanying drawings and referred to in the above description, as the preferred embodiment, is the most efficient and practical; yet realizing the conditions concurrent with the adoption of my device will necessarily vary, I desire to emphasize that various minor changes in details of construction, proportion and arrangement of parts may be resorted to, when required without sacrificing any of the advantages of my invention as set forth.

What I claim as new is:

A crosscut saw comprising a blade, a handle, a loop slidably mounted on the saw blade, said handle having an inwardly extending bore arranged to slidably receive the upper end of the loop, the upper edge of said saw blade having a cut-out portion therein, a leaf spring carried by the loop and arranged to fit in the cutout portion, a rack bar formed on said loop adjacent to the upper edge thereof, a pivoted arc carrying lever carried by the handle, the inner edge of said arc carrying lever having gear teeth formed thereon and arranged to mesh with the rack bar, and a pivoted bail carried by said handle and arranged to fit over the gear arc carrying lever to hold the same in its lowered locked position, as and for the purpose specified.

In testimony whereof I affix my signature in presence of two witnesses.

JEFF D. GOSS.

Witnesses:
T. CROSSOR,
B. F. RAY.

Copies of this patent may be obtained for five cents each, by addressing the "Commissioner of Patents, Washington, D. C."